March 31, 1936.   A. C. KORTE   2,036,150
FRONT AXLE ASSEMBLY FOR COASTER WAGONS
Original Filed Feb. 27, 1933    4 Sheets-Sheet 1

ALFRED C. KORTE
*INVENTOR*

BY
*ATTORNEY*

March 31, 1936.  A. C. KORTE  2,036,150

FRONT AXLE ASSEMBLY FOR COASTER WAGONS

Original Filed Feb. 27, 1933  4 Sheets-Sheet 2

ALFRED C. KORTE
*INVENTOR*

BY *George R. Ericson*
*ATTORNEY*

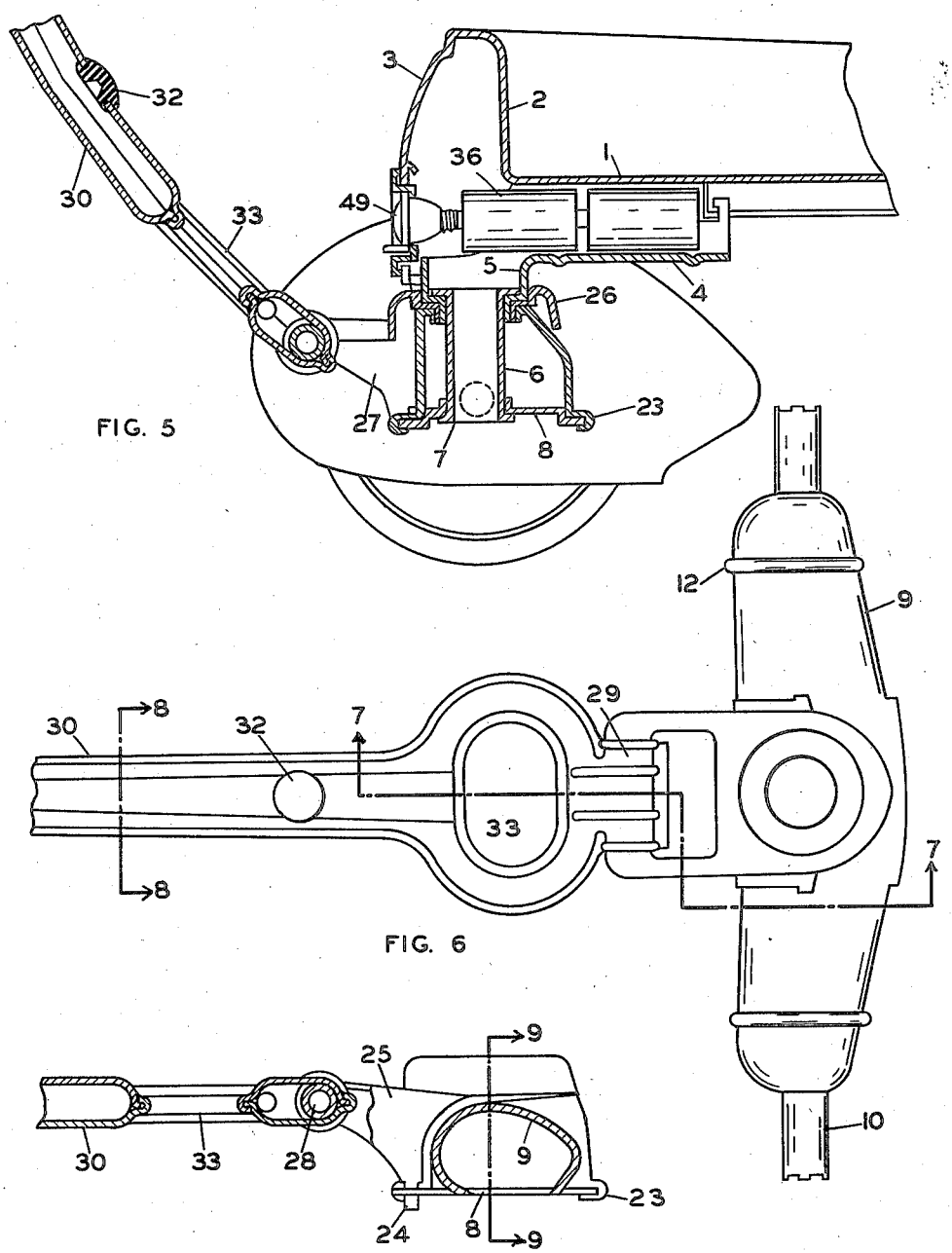

March 31, 1936. A. C. KORTE 2,036,150

FRONT AXLE ASSEMBLY FOR COASTER WAGONS

Original Filed Feb. 27, 1933   4 Sheets-Sheet 4

ALFRED C. KORTE
*INVENTOR*

BY *George R. Ericson*
*ATTORNEY*

Patented Mar. 31, 1936

2,036,150

UNITED STATES PATENT OFFICE 2,036,150

FRONT AXLE ASSEMBLY FOR COASTER WAGONS

Alfred C. Korte, St. Louis, Mo., assignor to Metalcraft Corporation, St. Louis, Mo., a corporation of Missouri Original application February 27, 1933, Serial No. 658,849. Divided and this application March 2, 1934, Serial No. 713,646

17 Claims. (Cl. 280—87.5)

This invention relates to improvements in front axle and wheel assemblies for coaster wagons, and one of its objects is to produce a generally new and improved axle structure.

A further object is to produce an axle, wheel, and guard of stream line formation for a child's coaster wagon, so that the wind resistance will be reduced in coasting, and also to substantially improve the general appearance of the vehicle.

A further object of the invention is to produce an axle for a child's coaster wagon having as much as possible of the wheel enclosed by a guard to prevent soiling and tearing the child's clothing by contact with the rotating wheels and tires.

A further object of the invention is to produce an axle for a child's coaster wagon of lighter weight and greater strength than provided by previous constructions.

Another object of the invention is to produce an axle for a child's coaster wagon which may be shipped knocked down, or disassembled from the wagon and assembled to the wagon at its destination without the use of any bolts, nuts or small parts which are likely to become lost in shipment.

The invention will be better understood from the following description and accompanying drawings, referring to which:

Figure 5 is a vertical longitudinal sectional view of the front end of the wagon.

Figure 6 is a plan view of the tongue, hounds and front and front axle.

Figure 7 is a fragmentary vertical sectional view taken along the lines 7—7 of Figure 6, looking in the direction of the arrows.

Figure 3:
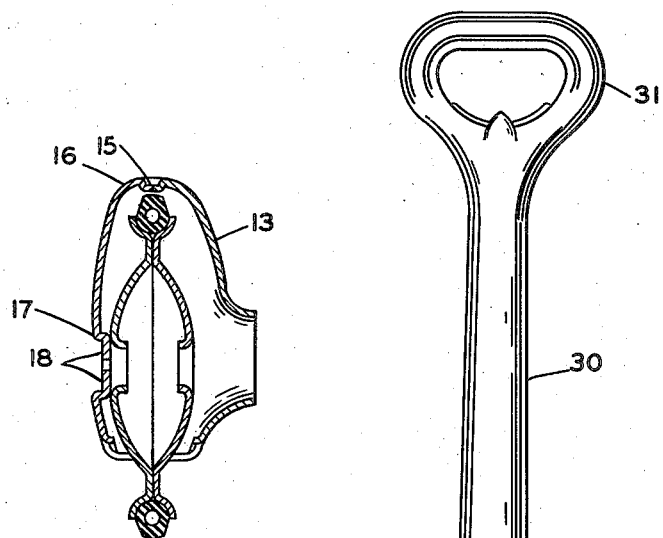
Figure 3 is a vertical sectional view showing one of the front wheels and its housing or guard.
Figure 1:
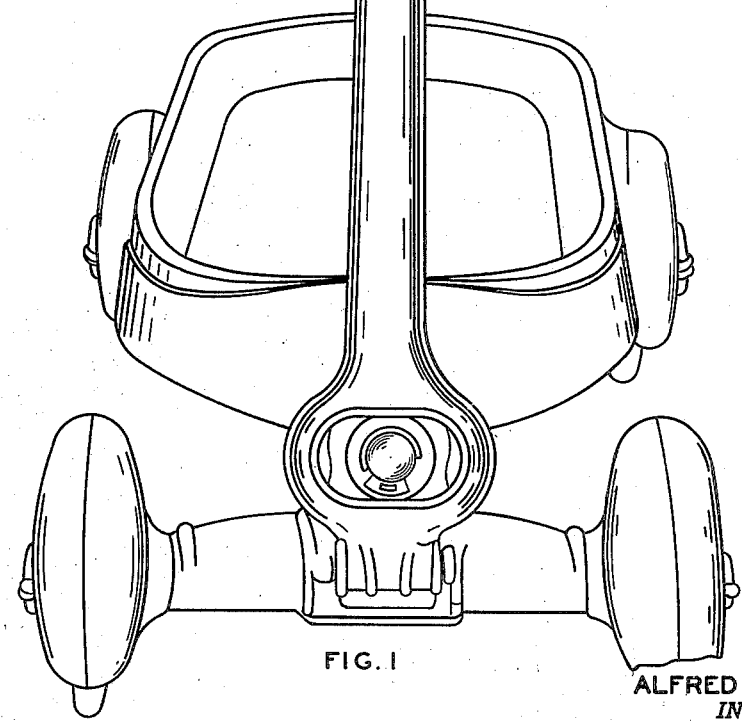
Figure 1 is a front end view of a wagon embodying my invention with the tongue raised to show the manner in which the headlight beam passes thru the hole in the tongue.

The reference numeral 1 indicates the sheet metal bed portion of the wagon to which the axle of my invention is to be attached. It may be noted here that this application is a division of my co-pending application Serial No. 658,849, filed February 27, 1933 in which the other parts of the wagon are shown and claimed. The bed of the wagon is surrounded by an inner wall 2, the upper portion of which is curved outwardly and downwardly to form an outer wall 3.

Below the front end of the wagon bed is a battery housing 4 which is attached to the bed and provided with a downturned annular projection 5 which serves as a support for the front end of the wagon and which receives the king pin 6. The upper end of the king pin is turned outwardly to form a flange which overlies a corresponding inturned flange at the lower end of the downwardly extending portion 5. The lower end of the king pin is provided with projections 47 which are turned outwardly to form a flange 7, underlying the lower axle member 8. The main member 9 of the front axle is formed of sheet metal and is of substantially oval or "tear-drop" shape as indicated in Figure 7. The lower portions being slightly flattened for road clearance and to conform to the lower axle member 8.

Wheel supporting bearing portions 10 are formed at each end of the main axle member. For convenience of manufacture, I prefer to form these bearing portions integral with the sheet metal main axle member 9 by simply curling the metal into a cylindrical formation, but it will be understood that these members could be separate and solid if desired, or they could be in the form of a shaft extending thru the main axle member from one end to the other. The ends of the bearing portions are preferably castellated as indicated at 11.

Figure 4:
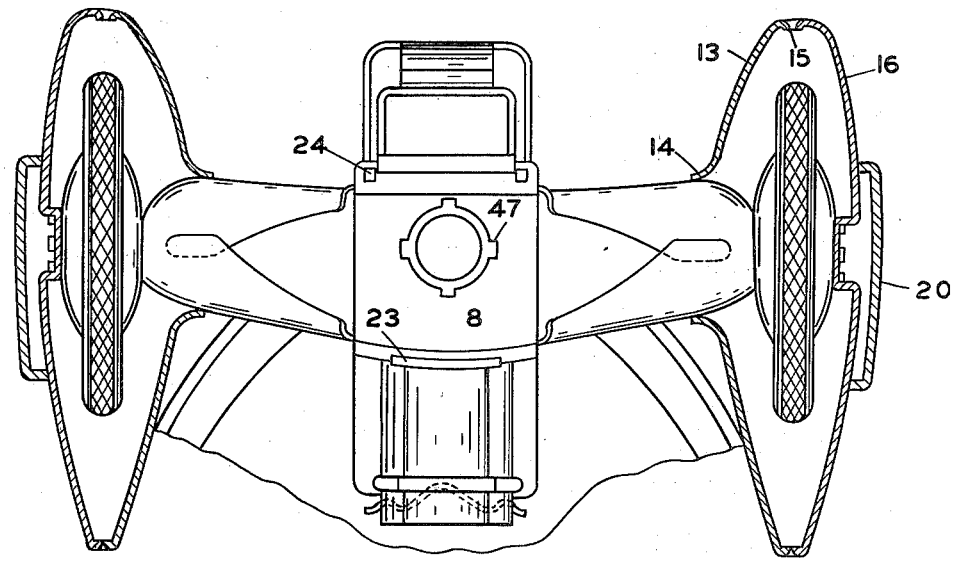
Figure 4 is an inverted plan of the front end of the wagon with some parts shown in section.
Figure 2:
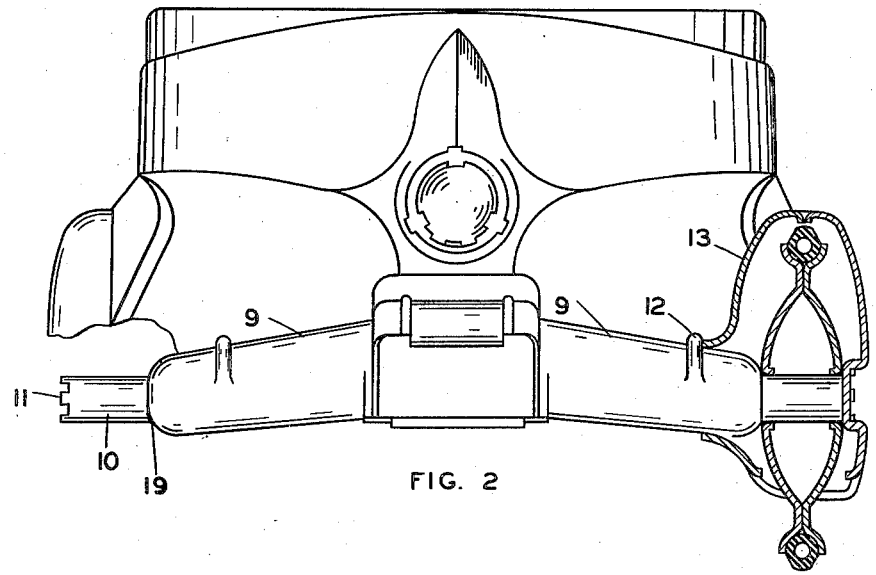
Figure 2 is a front view of the wagon with some parts removed and others shown in section.
Figure 9:
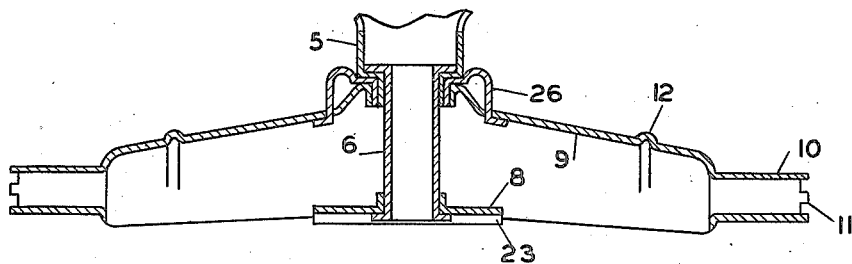
Figure 9 is a vertical sectional view of the axle, taken along the line 9—9 of Figure 7, looking in the direction of the arrows.
Figure 8:
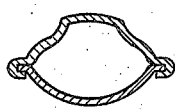
Figure 8 is a cross sectional view taken along the lines 8—8 of Figure 6 looking in the direction of the arrows.
Figure 10:
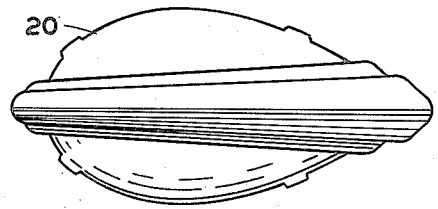
Figure 10 shows the cover plate for the end of the axle.
Figure 11:
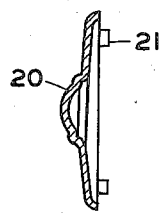
Figure 11 is a cross sectional view thru the cover plate shown in Figure 8.

The upper side of the main axle member is arched upwardly in the middle and is provided with an upstanding boss as indicated at 12 to support the inner wheel guard 13, which is formed of sheet metal and perforated in the center to receive the end of the main axle member as indicated at 14. The vertical longitudinal section of the outer edge of the inner wheel guard is formed in substantially "tear-drop" or oval shape for better streamlining and may be provided with a flange 15 against which the outer edge of the outer wheel guard 16 may rest. Suitable means for attaching such as spot-welding are provided. The outer wheel guard 16 has a vertical longitudinal cross-section of substantially oval or "teardrop" shape as indicated in Figure 5. Also the horizontal cross-section of the inner and outer wheel guard assembly is of stream lined shape as indicated in Figure 4.

The central part of the outer wheel guard is provided with an indented portion 17 which is perforated as indicated at 18 to receive the projections 11 on the end of the bearing portion 10.

The axle is capable of being shipped knocked down or disassembled from the wheels and wheel guards. Prior to assembly of the wheels to the axles, the projections 11 are straight or within the cylindrical contour of the bearing portion 10. Upon assembly the wheels 19 and the wheel guards are simultaneously fitted to the bearing portions 10 with the projections 11 extending thru the perforations 18 and the opening 14 resting against the boxes or ribs 12. The projecting ends of the projections 11 are then bent over with a hammer or pliers and the assembly is complete. It will be understood that the wheels are held in place between the inturned portions 17 of the outer wheel guard and the shoulders 19 of the main axle member.

In order to cover up the end of the bearing portion and to protect it from dust, a cover 20 is provided. This cover is formed with projections 21 which extend thru corresponding openings in the outside of the wheel guard. These projections are preferably bent slightly so that they will not loosely slip in and out of the corresponding openings in the wheel guards. This is to prevent the dust cover 20 from falling off in use. It would be possible, of course, to slide a punch up between the lower edge of the outer tire cover and the wheel to bend over the projections 21 after assembly, but this is usually found to be unnecessary if the members 21 are properly bent or twisted in the first place.

The lower axle member 8 is made of sheet metal attached to the main axle member and to the hounds by means of lugs 23 and 24, but may be spot welded instead if desired. The lug or flange 23 is an integral part of the lower edge of the main axle member and is bent over below the bottom plate. The projections 24 are formed integral with the hounds 25 and are bent over below the bottom plate to draw it up against the main axle member. The hounds are formed from sheet metal and provided with a downturned flange 26 which fits over the central part of the upper portion of the main axle member as indicated in Figure 5. The portion 26 is perforated and the inside of the perforation is turned downwardly to form the upper king pin bearing.

The tongue is attached to the hounds by means of two forwardly extending projections 27 which are formed of sheet metal integral with the hounds and turned inwardly and curled into bearing portions as indicated at 28 to which the tongue 30 is pivotally attached by means of the bearing 29. The tongue is provided with a handle 31 and a rubber bumper 32 is fitted to a suitable hole in the sheet metal tongue to prevent scratching the paint by contact between the tongue and the wagon bed. The tongue is formed in two pieces of sheet metal with a comparatively large hole 33 as indicated in Figures 6 and 7 so that when the tongue is raised the headlight 49 may shine thru the hole, otherwise the headlight would be useless when the tongue was in raised position. It may be noted that the headlight is operated by a pair of batteries 36, the subject matter being claimed in a separate application.

I claim:

1. In a child's coaster wagon, a centrally pivoted axle, said axle being made of sheet metal and arched in both fore and aft and transverse directions a bearing portion near each end of said axle, said bearing portions being fixed in axial alignment with each other, wheels mounted on said bearing portions, wheel guards enveloping the upper portions of each of said wheels, the inner side of each of said wheel guards being fixed to said axle and held against rotation with respect thereto, and the outer sides of said wheel guards being attached to the outer ends of said axle.

2. In a child's coaster wagon, a sheet metal axle, a cylindrical bearing portion near each end of said axle, wheels mounted on said bearing portions, a stream lined wheel guard enveloping the upper portion of said wheel, the inner side of said wheel guard being conformed to fit a portion of the axle, the outer side of said wheel guard having an opening therein to receive the outer end of said axle, the outer end of said axle being bent over outside of said opening to hold the parts in assembled relation.

3. In a device of the class described, an axle having a non-circular central portion, and a cylindrical bearing portion near each end, a wheel rotatably mounted on said bearing portion, a wheel guard for the upper portion of said wheel and having an inner opening constructed and arranged to fit the non-circular portion of said axle, the outer portion of said wheel guard having an opening in registration with a portion of said axle, and means extending thru said opening for attaching the wheel guard to the axle.

4. In a device of the class described, a unitary sheet metal axle comprising a non-circular central portion of comparatively large cross section, bearing portions outside of said central portions, wheels rotatably mounted on said bearing portions, sheet metal wheel guards for said wheels, said wheel guards substantially covering the upper side of said wheel, the inner sides of said wheel guards having openings to receive the non-circular portion of said axle, the outer sides of said wheel guards having openings to receive the outer ends of said axle, said wheel guards being constructed and arranged to hold said wheel on said bearing portion, and means for attaching said wheel guard to said axle.

5. In a device of the class described, an axle having a stream lined central portion, bearing portions near the outer ends of said axle, wheels mounted on said bearing portions, stream lined wheel guards substantially covering the upper portions of said wheels, the inner sides of said wheel guards having non-circular openings constructed and arranged to receive the stream lined portion of said axle, the outer sides of said wheel guards having openings adapted to receive the outer ends of said axle, said wheel guards serving as the sole means fore preventing removal of said wheels from said axle, and a device for preventing the removal of the wheel guard from the axle.

6. A stream-lined front axle assembly for a child's coaster wagon comprising an upwardly arched sheet metal member, bearing portions connected to the end of said member and extending outwardly therefrom, wheels mounted on said bearing portions, wheel guards mounted on said bearing portions outside of the wheel, said wheel guards being extended upwardly and inwardly and being joined to said first named member at a point inside the wheels.

7. A streamlined front axle assembly for a child's coaster wagon comprising an upwardly arched sheet metal member, bearing portions connected to the end of said member and extending outwardly therefrom, wheels mounted on said bearing portions, wheel guards mounted on said bearing portions outside of the wheel, said wheel guards being extended upwardly and inwardly and being joined to said first named member at a point inside the wheels, said wheel guards serving to hold said wheels in position, and means outside the wheel guards for holding them in position on the bearing portions.

8. A front wheel assembly for a child's coaster wagon comprising a sheet metal main member, said main member being arched upwardly in the middle to support the front end of a wagon bed and being provided with a king pin opening, said main member being curved downwardly at the end, wheel supporting bearing portions connected to the end of said main member and extending outwardly therefrom, wheels mounted on said bearing portions, streamlined wheel guards fully covering and protecting the upper outer part of said wheels, said wheel guards being attached to the outer ends of said bearing portions and means for connecting the inner edges of said wheel guards with said main member.

9. In a child's vehicle, a sheet metal axle member, means forming wheel bearings near the outer ends of said axle, wheels mounted on said bearings, streamlined wheel guards substantially covering the upper portion of said wheels, the inner sides of said wheel guards being non-rotatably mounted on said sheet metal axle member, the outer sides of said wheel guards having openings adapted to receive the outer ends of said axle, and means at the outer ends of the axle for detachably connecting the wheel guards thereto, said wheel guards serving as means for detachably preventing the removal of said wheels.

10. In a child's vehicle, a sheet metal axle member, means forming wheel bearings near the outer end of said axle, wheels mounted on said bearings, streamlined wheel guards substantially covering the upper portion of said wheels, the inner sides of said wheel guards being attached to said sheet metal axle member, the outer sides of said wheel guards having openings adapted to receive the outer ends of said axle, and devices at the outer ends of the axle for preventing the removal of the wheel guards from the axle, said wheel guards and devices serving as the sole means for preventing removal of said wheels from said axle.

11. A front axle assembly for a child's wagon comprising a centrally pivoted transversely arched sheet metal member having wheel bearing portions near each end thereof, wheels mounted on said bearing portions, and wheel guards mounted on and rigidly attached to said sheet metal member, said wheel guards including members attached to said sheet metal member at points outside of said wheels, and said wheel guards substantially enclosing the upper halves of said wheels.

12. A front axle assembly for a child's vehicle comprising a horizontally extending sheet metal load carrying member, the front and rear edges of said member being curved downwardly, a king pin opening near the central part thereof, and a wheel guard mounted on and attached to each end of said member, said wheel guards substantially enclosing the upper halves of said wheels.

13. A front axle assembly for a child's vehicle comprising a horizontally extending sheet metal load carrying member, the front and rear edges of said member being curved downwardly, a king pin opening near the central part thereof, a pair of wheels, and a wheel guard mounted on or attached to each end of said member, said wheel guards including members attached to the wheel bearings outside of the wheels.

14. A front axle structure for children's vehicles comprising a centrally pivoted sheet metal transverse member, the upper portion of said member being of generally arched construction, a wagon tongue operatively connected to said member and sheet metal wheel guards carried by said member, said wheel guards substantially covering the upper halves of said wheels.

15. A front axle structure for children's vehicles comprising a centrally pivoted sheet metal transverse member of arched construction both fore and aft and transversely, means including a wagon tongue for turning said member about its pivot, sheet metal wheel guards attached to the ends of said transverse member and a pair of wheels mounted between said wheel guards, said wheel guards substantially covering the upper halves of said wheels.

16. A front axle assembly for children's vehicles comprising a streamlined central sheet metal load carrying member, a wagon tongue, means for pivotally attaching said tongue to said load carrying member, wheel guards attached to said load carrying member, said wheel guards having edges conforming to the streamline of said load carrying member, means forming wheel bearings, said wheel guards being attached to said wheel bearing members.

17. An axle structure comprising a centrally pivoted sheet metal transverse member, said member being of arched construction in both fore and aft and tranverse directions, a pair of wheels and sheet metal wheel guards carried thereby, said wheel guards substantially covering the upper halves of said wheels.

ALFRED C. KORTE.